W. M. HEATON.
SPEEDOMETER.
APPLICATION FILED NOV. 5, 1912.
1,120,482.
Patented Dec. 8, 1914.
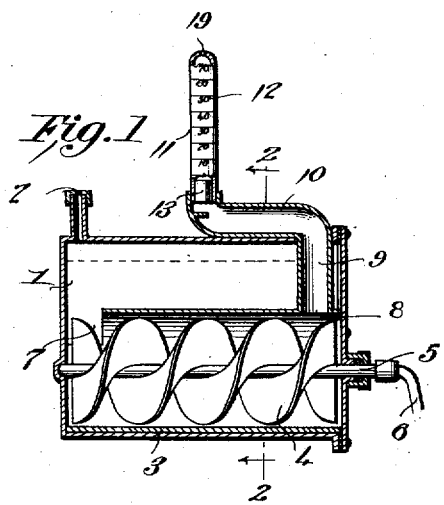
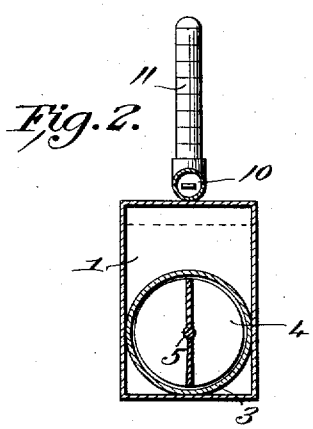
Witnesses
Carroll Bailey
R. M. Smith.
Inventor
Wilbur M. Heaton,
By Victor J. Evans
Attorney

UNITED STATES PATENT OFFICE.

WILBUR M. HEATON, OF PUEBLO, COLORADO.

SPEEDOMETER.

1,120,482.  Specification of Letters Patent.  Patented Dec. 8, 1914.

Application filed November 5, 1912. Serial No. 729,667.

*To all whom it may concern:*

Be it known that I, WILBUR M. HEATON, a citizen of the United States, residing at Pueblo, in the county of Pueblo and State of Colorado, have invented new and useful Improvements in Speedometers, of which the following is a specification.

This invention relates to speedometers, the object in view being to provide an exceedingly simple and yet reliable speedometer adapted for use with automobiles, and other mechanically propelled vehicles to indicate the speed at which the machine is traveling.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a vertical longitudinal section through a speedometer embodying the present invention. Fig. 2 is a vertical cross section through the same on the line 2—2 of Fig. 1.

Refering to the drawings, 1 designates a liquid reservoir provided in the top thereof with an air vent 2 to admit of the circulation and movement of the liquid contained in the reservoir.

In the bottom of the reservoir 1 is arranged a hollow cylindrical casing 3, in which is rotatably mounted a screw or spiral propeller 4, the same being mounted fast on a rotary shaft 5 journaled in bearings in the opposite ends of the reservoir, as shown.

6 designates a flexible shaft for imparting rotary motion to the shaft 5, the said flexible shaft 6 being adapted to be connected to the wheel or other revolving part of the machine, so as to transmit the motion of such part of the machine to the screw 4.

The cylinder 3 is open at both ends to receive and discharge the liquid contained in the reservoir 1, 7 designating the entrance at one end of the cylinder, and 8 the exit at the opposite end thereof.

At one end of the reservoir is an upright tube 9 which leads off from the casing 3, in which the spiral screw operates.

Under the arrangement shown in Fig. 1, the tube 9 is extended horizontally, as shown at 10, and then vertically, as shown at 11, the upright portion 11 of the tube being transparent, so that the liquid contained in the reservoir 1 may be observed as it moves upward within the tube. This tube is graduated, as shown at 12, to indicate miles per hour or revolutions per minute, as may be desired, said graduations being properly spaced and numbered in accordance with the action of the screw on the liquid to obtain the necessary accuracy in the registry between the colored liquid and said graduations. If desired, a float 13 may be placed in the tube 11, so that it may move up and down in accordance with the height of the liquid in said tube. In this case, the float 13 may be made to register with the graduations to indicate the speed.

It will be observed that while the screw or propeller is constantly immersed in the liquid contained in the reservoir, such liquid is caused to pass lengthwise through the cylindrical casing of the screw, in accordance with the direction in which such screw is rotated. This insures the forcing of the liquid into the tube or passage 9, causing the elevation thereof, which will produce the necessary indication in the tube 11 or upon the graduated arc or dial 18, as above set forth.

19 designates a vent in the upper end of the tube 11 to prevent the formation of an air cushion in said tube as the liquid rises therein.

It will be noted that the casing 3 is of less length than the screw 4 and the reservoir 1 and that the screw 4 is of the full length of the reservoir 1. Therefore, the liquid propelling screw extends beyond the receiving end of the casing 3 so as to draw the liquid into the casing 3. Furthermore, the tubular elbow which connects with the opposite end of the casing 3 has a horizontal run 10 and the outer end thereof is then turned upward in the form of a short secondary elbow to receive the lower end of the graduated transparent tube in which the float 13 moves. The result is that the horizontal run 10 is in the nature of a trap or dwell section of the elbow which has a decided tendency to steady the liquid in the tubular elbow and the graduated tube and avoid excessive amplitude of fluctuation of the liquid and the consequent rapid bobbing up and down of the float 13 which would interfere with the accurate reading of the speedometer.

What is claimed is:

A speedometer comprising a liquid reservoir, a liquid propelling screw rotatable within the body of the reservoir, a cylindrical casing for said screw of a length less than the screw contained wholly within the reservoir and open at one end to receive the liquid, a tubular elbow communicating with the opposite end of said casing and passing through the wall of said casing, a vertical transparent graduated tube communicating with the outer end of said elbow, and a float movable up and down in said tube by the buoyant action of the liquid and adapted to register with the graduations of said tube.

In testimony whereof I affix my signature in presence of two witnesses.

WILBUR M. HEATON.

Witnesses:
C. K. FLETCHER,
LEE J. DILLMAN.

Copies of this patent may be obtained for five cents each, by addressing the "Commissioner of Patents, Washington, D. C."